(12) United States Patent
Hirata et al.

(10) Patent No.: US 10,816,080 B2
(45) Date of Patent: Oct. 27, 2020

(54) VEHICLE POWER TRANSMISSION DEVICE

(71) Applicant: TOYOTA JIDOSHA KABUSHIKI KAISHA, Toyota-shi, Aichi (JP)

(72) Inventors: Marina Hirata, Toyota (JP); Seitaro Nobuyasu, Okazaki (JP); Hiroshi Hata, Nagoya (JP); Shigetsugu Iwata, Toyota (JP); Atsushi Kawamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/151,723

(22) Filed: Oct. 4, 2018

(65) Prior Publication Data
US 2019/0107190 A1 Apr. 11, 2019

(30) Foreign Application Priority Data
Oct. 6, 2017 (JP) .................................. 2017-196067

(51) Int. Cl.
| | | |
|---|---|---|
| *F16H 57/031* | (2012.01) | |
| *B60K 17/04* | (2006.01) | |
| *F16H 57/03* | (2012.01) | |
| *F16H 57/028* | (2012.01) | |
| *F16H 57/02* | (2012.01) | |
| *B60K 6/36* | (2007.10) | |
| *F16H 57/029* | (2012.01) | |

(Continued)

(52) U.S. Cl.
CPC ........... *F16H 57/031* (2013.01); *B60K 17/04* (2013.01); *B60K 6/36* (2013.01); *B60K 17/08* (2013.01); *B60Y 2200/92* (2013.01); *B60Y 2410/10* (2013.01); *F16H 57/028* (2013.01); *F16H 57/029* (2013.01); *F16H 57/03* (2013.01); *F16H 57/032* (2013.01); *F16H 2057/02034* (2013.01)

(58) Field of Classification Search
CPC ...... F16H 57/031; F16H 57/029; F16H 57/03; F16H 2057/02034; F16H 57/028; F16H 57/032; B60K 17/04; B60K 6/36
See application file for complete search history.

(56) References Cited

U.S. PATENT DOCUMENTS 2,695,725 A * 11/1954 Chatfield .............. F16H 57/029
220/327
6,557,438 B2 * 5/2003 Maeda ................... F01M 13/00
184/6.12

(Continued)

FOREIGN PATENT DOCUMENTS

DE 19831208 C1 * 5/1999 ............... B61C 9/38
GB 2038414 A * 7/1980 ............... F02B 67/04
(Continued)

*Primary Examiner* — Vicky A Johnson
(74) *Attorney, Agent, or Firm* — Oliff PLC (57) ABSTRACT

In a vehicle power transmission device including a case housing a power transmission mechanism and a cover covering a side surface of the case in a vehicle width direction, the cover includes a stepped portion with a vehicle rear-side portion projecting outward in the vehicle width direction in a horizontal cross section, a front-side extending portion extending from the stepped portion to the vehicle front side and a plate-shaped inclined rib disposed at a corner portion between the stepped portion and the front-side extending portion, and inclined toward the front-side extending portion from a leading end portion of the stepped portion to the vehicle front side.

20 Claims, 5 Drawing Sheets

(51) Int. Cl.
*F16H 57/032* (2012.01)
*B60K 17/08* (2006.01)

(56) References Cited

U.S. PATENT DOCUMENTS

| | | | |
|---|---|---|---|
| 2005/0229742 A1* | 10/2005 | Komura | F16H 57/028 74/606 R |
| 2014/0084627 A1 | 3/2014 | Yamanaka et al. | |
| 2019/0107190 A1* | 4/2019 | Hirata | F16H 57/031 |

FOREIGN PATENT DOCUMENTS

| | | |
|---|---|---|
| JP | 2012-126152 A | 7/2012 |
| JP | 2015-90203 A | 5/2015 |
| JP | 2015-140029 A | 8/2015 |
| JP | 2016-038068 A | 3/2016 |
| WO | 2012/160618 A1 | 11/2012 |

\* cited by examiner

VEHICLE POWER TRANSMISSION DEVICE

This application claims priority from Japanese Patent Application No. 2017-196067 filed on Oct. 6, 2017, the disclosure of which is herein incorporated by reference in its entirety.

BACKGROUND OF THE INVENTION

Field of the Invention

The present invention relates to a vehicle power transmission device and, more particularly, to improvement of a vehicle power transmission device with a side surface in a vehicle width direction covered with a cover.

Description of the Related Art

There is known a vehicular power transmission device having a case housing a power transmission mechanism and a cover covering a side surface of the case in a vehicle width direction. A device described in Patent Document 1 is an example thereof and has a cover (cover member 90) disposed on a side surface portion provided with a control device, a clutch actuator etc. so as to prevent damage thereof (see paragraphs 0095, 0096).

CITATION LIST

Patent Document 1: Japanese Laid-Open Patent Publication No. 2016-38068

SUMMARY OF THE INVENTION

Technical Problem

However, even in such a vehicle power transmission device, when the cover has a stepped portion with a vehicle rear-side portion projecting outward in a horizontal cross section, and a neighboring member such as a body component is moved backward i.e., to the rear of a vehicle at the time of a vehicle collision, the member may be caught on the stepped portion, possibly damaging the cover. The body component includes a bumper etc., has a larger amount of backward movement at the time of a vehicle collision as compared to the vehicle power transmission device disposed in a frame etc. of the vehicle, and may be moved backward relative to the vehicle power transmission device. When the cover is broken, the neighboring member is more likely to come into direct contact with the case and damage the case, and a damaged portion (such as a through-hole) of the case may be exposed to the outside, possibly exposing a high-voltage electric component housed in the case, for example.

The present invention was conceived in view of the situations and it is therefore an object of the present invention to prevent a cover covering a side surface of a case and having a stepped portion projecting to the outside from being damaged due to a neighboring member coming into contact with the stepped portion at the time of a vehicle collision.

Solution to Problem

To achieve the above object, a first aspect of the present invention provides a vehicle power transmission device including a case housing a power transmission mechanism and a cover covering a side surface of the case in a vehicle width direction, wherein the cover includes a stepped portion with a vehicle rear-side portion projecting outward in the vehicle width direction in a horizontal cross section, a front-side extending portion extending from the stepped portion to the vehicle front side and a plate-shaped inclined rib disposed at a corner portion between the stepped portion and the front-side extending portion and inclined toward the front-side extending portion from a leading end portion of the stepped portion to the vehicle front side.

A second aspect of the present invention provides the vehicle power transmission device recited in the first aspect of the invention, wherein the cover is made of a synthetic resin integrally with the inclined rib.

A third aspect of the present invention provides the vehicle power transmission device recited in the first or second aspect of the invention, wherein the cover includes a plurality of the inclined ribs disposed away from each other in a vehicle vertical direction in a substantially horizontal posture.

Being substantially horizontal may not be strictly horizontal in the longitudinal direction and the lateral direction of the vehicle and is intended to allow a slight inclination of ±5° or less (within a range of +5° to −5°) relative to a horizontal plane.

A fourth aspect of the present invention provides the vehicle power transmission device recited in the third aspect of the invention, wherein (a) the front-side extending portion is fixed to a side surface of the case by a mounting bolt, and wherein (b) the inclined ribs are disposed at a plurality of positions including two positions vertically adjacent across a head portion of the mounting bolt.

A fifth aspect of the present invention provides the vehicle power transmission device recited in the fourth aspect of the invention, wherein the mounting bolt is disposed at a position where a height of the inclined rib is greater than a projecting dimension of the head portion of the mounting bolt so that the head portion is hidden by the adjacently disposed inclined ribs when viewed in the vehicle vertical direction.

A sixth aspect of the present invention provides the vehicle power transmission device recited in any one of the first to fifth aspects of the invention, wherein (a) a soundproof seal member is interposed between the front-side extending portion and the side surface of the case, and wherein (b) the inclined ribs are disposed such that the inclined ribs include a portion of the front-side extending portion in which the seal member is interposed.

A seventh aspect of the present invention provides the vehicle power transmission device recited in any one of the first to sixth aspects of the invention, wherein (a) the cover forms a hat (brimmed hat) cross-sectional shape including a flange portion on the outer circumferential side, a cylindrical side surface portion rising from an inner circumferential edge of the flange portion, and a leading-end closing portion closing the leading end of the cylindrical side surface portion, wherein (b) the cover is attached to the side surface of the case in a posture with the leading-end closing portion projecting to the outside in the vehicle width direction and the flange portion facing the side surface of the case, and wherein (c) a portion of the cylindrical side surface portion of the cover in the vehicle front side is the stepped portion while a portion of the flange portion of the cover in the vehicle front side is the front-side extending portion.

An eighth aspect of the present invention provides the vehicle power transmission device recited in any one of the first to seventh aspects of the invention, wherein an electric component using a high voltage of 400 V or more is housed inside a side surface portion of the case provided with the cover.

A ninth aspect of the present invention provides the vehicle power transmission device recited in any one of the first to eighth aspects of the invention, wherein (a) the vehicle power transmission device is a transversely-mounted vehicle power transmission device in which the power transmission mechanism is disposed such that rotation axes of the power transmission mechanism are on a plurality of axes substantially parallel to the vehicle width direction, wherein (b) the vehicle power transmission device includes a rotating machine coupled to the power transmission mechanism in a power transmittable manner at one end portion in the vehicle width direction, wherein (c) the case includes a rotating-machine-side case portion covering the one end portion, and wherein (d) the cover is attached to the rotating-machine-side case portion.

Advantageous Effects of Invention

The vehicle power transmission device described above is provided with the inclined ribs at the corner portion between the stepped portion of the cover and the front-side extending portion, and therefore, even the neighboring member relatively moving backward and interfering with the cover at the time of a vehicle collision is moved in a sliding manner on the ends (inclined edges) of the inclined ribs and runs up onto the end (projecting end) of the stepped portion while deforming the cover without being caught on the stepped portion, so that the damage of the cover is prevented. Particularly, since the plate-shaped inclined ribs provide high rigidity against loads from the front side and the lateral side of the vehicle, the front-side extending portion and the stepped portion are pushed inward as a whole so that the contact is suppressed between the stepped portion and the neighboring member, and the damage of the cover is appropriately prevented as compared to when the front-side extending portion itself is inclined, for example. Specifically, when the front-side extending portion itself is inclined, the plate-shaped front-side extending portion even having an inclined surface is easily locally dented and deformed and therefore may be broken due to the neighboring member caught on the dented and deformed portion. When the damage of the cover is prevented due to the presence of the inclined ribs in this way, the neighboring member is prevented from coming into direct contact with the case, so that the case can properly be protected, and even if the case is damaged, the damaged portion is covered with the cover and therefore prevented from being exposed to the outside. Since the case of aluminum casting etc. has low toughness, the case may be damaged while the cover is not broken.

In the second aspect of the invention, since the cover is integrally molded from the synthetic resin with the inclined ribs, higher toughness is obtained as compared to a metal plate such as an iron plate, and the damage of the cover is more properly prevented. Since the rigidity is lower as compared to a metal plate, noise (vibration) such as gear noise emitted from the case is absorbed by the cover, and the NV (Noise, Vibration) performance in the vehicle interior is improved. Specifically, a soundproofing measure is taken in addition to a damage prevention measure of the case without increasing the number of vehicle components, so that cost reduction and weight reduction can be achieved as compared to when these measures are separately taken.

In the third aspect of the invention, since the inclined ribs are disposed in a substantially horizontal posture, high rigidity is obtained against loads from the front side and the lateral side of the vehicle, and the effect of preventing the damage of the cover can properly be obtained. Since the inclined ribs are disposed away from each other in the vehicle vertical direction, the neighboring member is reliably brought into contact with the inclined ribs regardless of a collision form or is brought into contact with a plurality of the inclined ribs, so that the damage of the cover can more properly be prevented.

In the fourth aspect of the invention, the front-side extending portion is fixed to the side surface of the case by the mounting bolt, and the inclined ribs are disposed at a plurality of positions including two positions vertically adjacent across the head portion of the mounting bolt. This reduces or suppresses the contact of the neighboring member with the bolt head portion, and the cover is prevented from coming off due to shear fracture of the bolt head portion etc. In the fifth aspect of the invention, the mounting bolt is disposed at a position where a height of the inclined rib is greater than a projecting dimension of the head portion of the mounting bolt so that the head portion is hidden by the adjacently disposed inclined ribs when viewed in the vehicle vertical direction. This more properly suppresses the contact of the neighboring member with the bolt head portion In the sixth aspect of the invention, the soundproof seal member is interposed between the front-side extending portion and the side surface of the case, and the inclined ribs are disposed such that the inclined ribs include a portion of the front-side extending portion in which the seal member is interposed. Therefore, the rigidity of the front-side extending portion is increased to suppress deformation thereof, so that the sealing performance, i.e., the soundproofing performance, of the seal member can properly be ensured.

In the seventh aspect of the invention, the cover forms a hat cross-sectional shape with the flange portion, the cylindrical side surface portion, and the leading-end closing portion. The cover can cover and properly protect the side surface of the case, and the inclined ribs are disposed at the corner portion between the cylindrical side surface portion (stepped portion) and the flange portion (front-side extending portion) in the vehicle front-side portion of the cover, so that the damage of the cover is prevented.

In the eighth aspect of the invention, the electric components using a high voltage are housed inside the side surface portion of the case attached to the cover. Since the damage of the cover is prevented due to the presence of the inclined ribs, even if the case is damaged (pierced), the damaged portion is covered by the cover and therefore, the high-voltage electric components are prevented from being exposed to the outside so that safety is secured.

The ninth aspect of the invention relates to a transversely-mounted vehicle power transmission device having a rotating machine, wherein the rotating machine is disposed at one end portion in the vehicle width direction while the cover is attached to a rotating-machine-side case portion covering the one end portion. Since the damage of the cover is prevented due to the presence of the inclined ribs, even if the rotating-machine-side case portion is damaged, the damaged portion is covered by the cover and therefore, the rotating machine and the electric cables etc. are prevented from being exposed to the outside so that safety is secured.

DESCRIPTION OF THE PREFERRED EMBODIMENTS

The present invention is preferably applied to a vehicle power transmission device having a high-voltage rotating machine (an electric motor, a generator, a motor generator) of 400 V or more, for example, i.e., a vehicle power transmission device for a hybrid vehicle having an engine (internal combustion engine) and an electric motor as a drive power source or an electric vehicle having only an electric motor and may also be applied to power transmission devices for other vehicles such as an engine-driven vehicle not requiring a rotating machine. The present invention is preferably applied to a transversely-mounted vehicle power transmission device in which a power transmission mechanism is disposed such that rotation axes of the power transmission mechanism are on multiple axes substantially parallel to a vehicle width direction and may also be applied to a longitudinally-mounted vehicle power transmission device in which the power transmission mechanism is disposed such that the rotation axes of the power transmission mechanism are on at least one axis in a vehicle longitudinal direction. The power transmission mechanism is a planetary gear device, a transmission gear, a chain, a belt, etc., and may be a planetary gear type or a parallel shaft type multi-speed transmission or a belt type continuously variable transmission. The power transmission mechanism may be disposed with a rotating machine functioning as an electric motor or a generator.

A cover covering a side surface of a case may cover the entire side surface or may cover only a portion of the side surface. Although a material suitable for the cover is a synthetic resin having relatively high toughness and difficult to break, a cover made of metal and other materials such as an iron plate is also employable. For the synthetic resin, for example, a 6-nylon-based resin material such as PA6 and PA66 is preferably used, and other synthetic resin materials is also employable. The cover forms, for example, a shallow hat (brimmed hat) cross-sectional shape, and includes a flange portion on the outer circumferential side, a cylindrical side surface portion rising from an inner circumferential edge of the flange portion, and a leading-end closing portion closing a leading end of the cylindrical side surface portion. The flange portion and the leading-end closing portion may be formed as flat surfaces, for example, or may have a curved surface shape, an uneven shape, etc. changing in accordance with the shape of the case. The cover may not necessarily have a hat cross-sectional shape and may include a stepped portion with a vehicle rear-side portion projecting outward at least in a horizontal cross section, i.e., a projecting portion easily caught when a neighboring member relatively moves backward. The stepped portion may not necessarily project at a right angle, and the present invention is also applicable even when the stepped portion obtusely projects outward in the vehicle width direction.

For example, an inclined rib is linearly disposed to connect the leading end of the stepped portion and a front end of a front-side extending portion; however, an inclined rib can be disposed such that a leading end in the vehicle width direction (an inclined edge) forms a smooth convex or concave curved line. The inclined rib may not necessarily be disposed to the front end of the front-side extending portion and may be disposed only to an intermediate position of the front-side extending portion in the vehicle longitudinal direction. Although the only one inclined rib may be disposed on the side surface of the case at a position where protection is particularly required or at a position where a neighboring member is brought into contact at the time of a vehicle collision, multiple inclined ribs are desirably disposed away from each other in the vertical direction of the vehicle in consideration of a protection performance of the case, various collision forms, a damage prevention effect of the cover, etc. The inclined rib is desirably disposed in a substantially horizontal posture or can be tilted by ±5° or more in the longitudinal direction or the lateral direction of the vehicle in consideration of the shape of the cover etc. This angle is desirably about ±20° or less. The inclined rib is desirably integrally formed with the cover by integral molding etc. or may be fixed to the cover by a fixing means such as an adhesive.

If the front-side extending portion is fixed to the case by a mounting bolt, the inclined ribs are desirably disposed at two adjacent positions on the upper and lower sides across a head portion of the mounting bolt; however, the effect of reducing or preventing the contact of the neighboring member with the bolt head portion can be obtained by disposing the inclined rib only on one of the upper and lower sides. In this case, the mounting bolt is desirably disposed at a position where the height of the inclined rib is greater than the projecting dimension of the bolt head portion so that the bolt head portion is hidden by the inclined rib when viewed in the vehicle vertical direction; however, a portion of the bolt head portion may be projected from the inclined rib. The cover may not necessarily be attached to the case with a mounting bolt and may be fixed to the case by another fixing means such as an adhesive.

Although a soundproof seal member is disposed between the front-side extending portion of the cover and the side surface of the case as needed, the seal member may not be included. When the cover has a hat cross-sectional shape, an annular seal member is desirably disposed over the entire circumference of the flange portion. A seal member may be interposed between the leading-end closing portion and the case. For the seal member, for example, a sponge made of EPDM (ethylene-propylene diene monomer) is preferably used; however, other soundproof seal materials are also employable.

Example

An example of the present invention will now be described in detail with reference to the drawings. In the following example, the figures are simplified or deformed as appropriate for description and portions are not necessarily precisely drawn in terms of dimension ratio, shape, etc.

Figure 1:
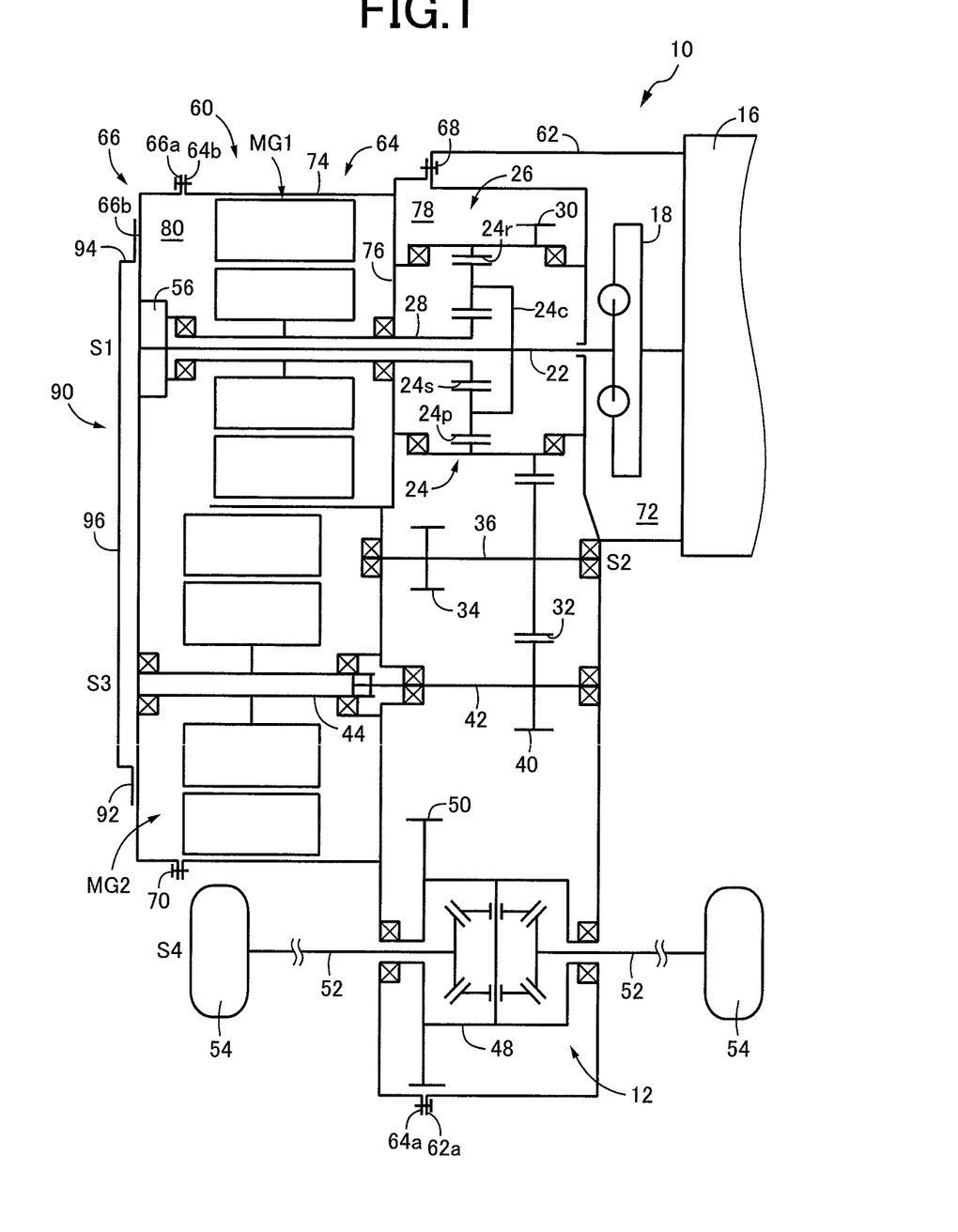
FIG. 1 is a skeleton diagram for explaining a vehicle power transmission device for a hybrid vehicle that is an example of the present invention.

FIG. 1 is a skeleton diagram for explaining a vehicle power transmission device 10 that is an example of the present invention, the device 10 includes a case 60 housing a power transmission mechanism 12, and the case 60 is fixed to an engine 16. FIG. 1 is also a development diagram showing the device 10 developed such that multiple shafts constituting the power transmission mechanism 12 housed in the case 60 are located in a common plane. The vehicle power transmission device 10 is a power transmission device for a transversely-mounted hybrid vehicle such as an FF (front-engine front-wheel drive) type vehicle in which multiple shafts are arranged along a vehicle width direction and includes first to fourth axes S1 to S4 substantially parallel to the vehicle width direction. An input shaft 22 coupled to the engine 16 via a damper device 18 is disposed on the first axis S1, and a single pinion type planetary gear device 24 and a first motor generator MG1 are disposed concentrically with the first axis S1. The planetary gear device 24 and the first motor generator MG1 function as an electrically controlled differential portion 26, and the input shaft 22 is coupled to a carrier 24c of the planetary gear device 24 serving as a differential mechanism, while a rotor shaft 28 of the first motor generator MG1 is coupled to a sun gear 24s of the planetary gear device 24, and a ring gear 24r of the planetary gear device 24 is provided with an engine output gear 30. The sun gear 24s and the ring gear 24r are meshed with a plurality of pinions 24p of the planetary gear device 24 rotatably disposed on the carrier 24c. The engine output gear 30 corresponds to an output member.

The first motor generator MG1 is alternatively used as an electric motor and a generator, and rotation speed of the sun gear 24s is continuously controlled through regenerative control etc. for functioning as a generator, so that rotation speed of the engine 16 is continuously changed and output from the engine output gear 30. When torque of the first motor generator MG1 is set to zero and the sun gear 24s is idled, an output from the engine 16 is interrupted while the engine 16 is prevented from being rotated during motor running and coasting. The engine 16 is an internal combustion engine such as a gasoline engine and a diesel engine combusting fuel to generate power and is used as a drive power source for running. The input shaft 22 is inserted through an axis of the first motor generator MG1 and coupled to an oil pump 56, so that the oil pump 56 is rotationally driven by the engine 16.

A counter shaft 36 provided with a large reduction gear 32 and a small reduction gear 34 is rotatably disposed on the second axis S2, and the large reduction gear 32 is meshed with the engine output gear 30. The large reduction gear 32 is also meshed with a motor output gear 40 disposed on the third axis S3. The motor output gear 40 is disposed on a gear shaft 42, and the gear shaft 42 is coupled by spline fitting in a power transmittable manner to a rotor shaft 44 of a second motor generator MG2 disposed on the third axis S3. The second motor generator MG2 is alternatively used as an electric motor and a generator and is used as a drive power source for running when subjected to power running control for functioning as an electric motor, for example. The vehicle power transmission device 10 is a double-axis hybrid-vehicle power transmission device in which the second motor generator MG2 is disposed on the third axis S3 different from the first axis S1 on which the engine 16 and the electrically controlled differential portion 26 are disposed. The first motor generator MG1 and the second motor generator MG2 are a pair of rotating machines adjacently arranged in parallel on the different axes parallel to each other and are disposed in one end portion on the side opposite to the engine 16 in the vehicle width direction (end portion on the left side of FIG. 1).

The vehicle power transmission device 10 of this example is a transaxle, and the small reduction gear 34 is meshed with a differential ring gear 50 of a differential device 48 disposed on the fourth axis S4. A drive power transmitted from the engine 16 and the second motor generator MG2 to the differential ring gear 50 is distributed to right and left drive shafts 52 via the differential device 48 and is transmitted to right and left driving wheels 54 for rotary drive.

The vehicle power transmission device 10 includes the case 60 integrally fixed to the engine 16 and supported by a vehicle body via a bracket etc. The case 60 is made up of three members, i.e., a front case portion 62, an intermediate case portion 64, and a rear case portion 66, which are integrally fastened by multiplicities of fastening bolts 68, 70 such that butting portions 62a, 64a, 64b, 66a such as flanges disposed at respective axial end portions are butted each other. Specifically, the butting portion 62a of the front case portion 62 and the butting portion 64a of one opening portion of the intermediate case portion 64 are integrally fixed by the multiplicity of the fastening bolts 68, and the butting portion 64b of the other opening portion of the intermediate case portion 64 and the butting portion 66a of the rear case portion 66 are integrally fixed by the multiplicity of the fastening bolts 70. The butting portions 62a, 66a are provided with insertion holes through which the fastening bolts 68, 70 are respectively inserted, and the butting portions 64a, 64b are provided with screw holes into which the fastening bolts 68, 70 are respectively screwed.

The front case portion 62 is integrally fixed to the engine 16 and forms with the engine 16 a first housing space 72 housing the damper device 18. The intermediate case portion 64 integrally includes a cylindrical (tubular) outer cylinder wall 74 and a partition wall 76 disposed to extend from the outer cylinder wall 74 to the inner circumferential side in a posture substantially orthogonal to the first to fourth axes S1 to S4, and a second housing space 78 housing the electrically controlled differential portion 26, the counter shaft 36, the gear shaft 42, the differential device 48, etc. is formed between the front case portion 62 and the partition wall 76. The front case portion 62 and the partition wall 76 include support portions rotatably supporting the engine output gear 30, the counter shaft 36, the gear shaft 42, the differential device 48, etc. via bearings. A third housing space 80 housing the first motor generator MG1 and the second motor generator MG2 is formed between the rear case portion 66 and the partition wall 76. The rear case portion 66 and the partition wall 76 include support portions rotatably supporting the rotor shafts 28, 44 via bearings.

The rear case portion 66 corresponds to rotating-machine-side case portion for covering one end portion of the power transmission mechanism 12 in the vehicle width direction, i.e., an end portion on the side disposed with the first motor generator MG1 and the second motor generator MG2. The rear case portion 66 has a shallow bottomed cylindrical shape and has a bottom surface portion 66b constituting a side surface of the case 60 on the one end portion side in the vehicle width direction. A cover 90 is attached to cover the bottom surface portion 66b. The cover 90 is for the purposes of suppression of (soundproofing against) propagation of noise such as gear noise and motor noise emitted from the rear case portion 66 and prevention of damage to the rear case portion 66 in the case of contact of a neighboring member 120 (see FIG. 5) with the rear case portion 66 at the time of a vehicle collision.

Figure 2:
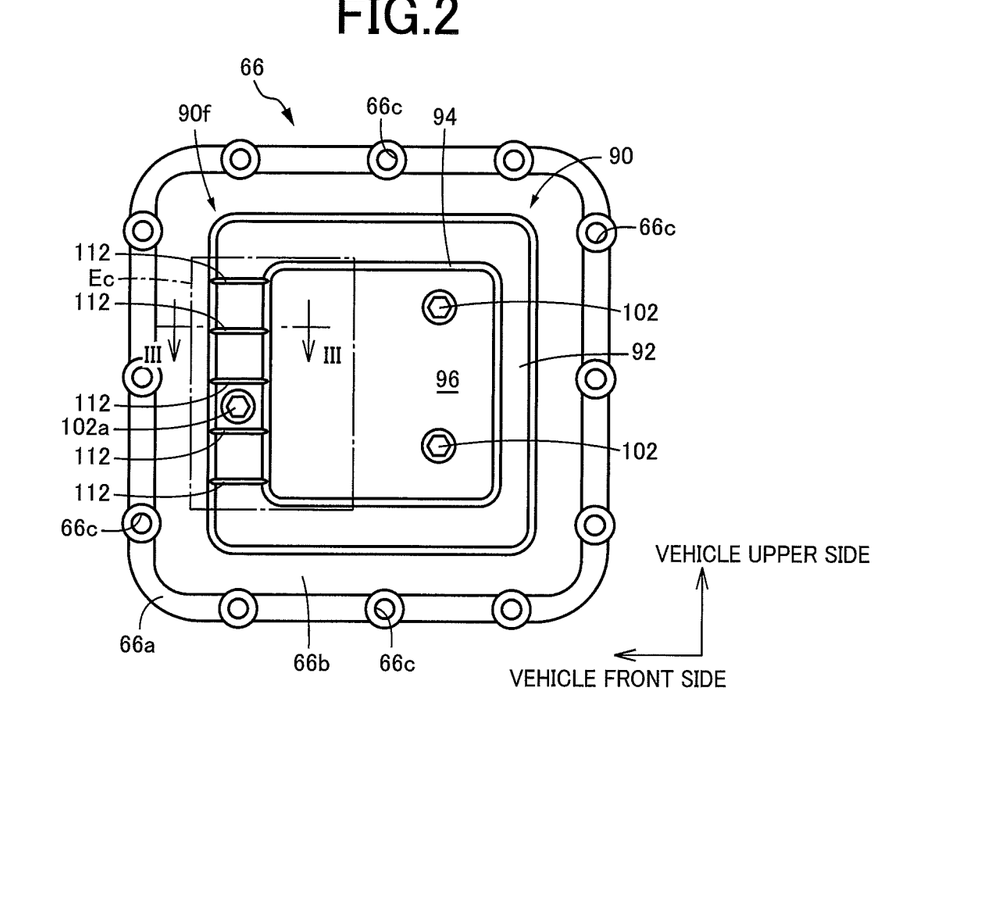
FIG. 2 is a view for explaining a specific example of a rear case portion constituting a side surface of a case of the vehicle power transmission device of FIG. 1 and a cover attached to the rear case portion and is a schematic front view not including minor irregularities.
Figure 3:
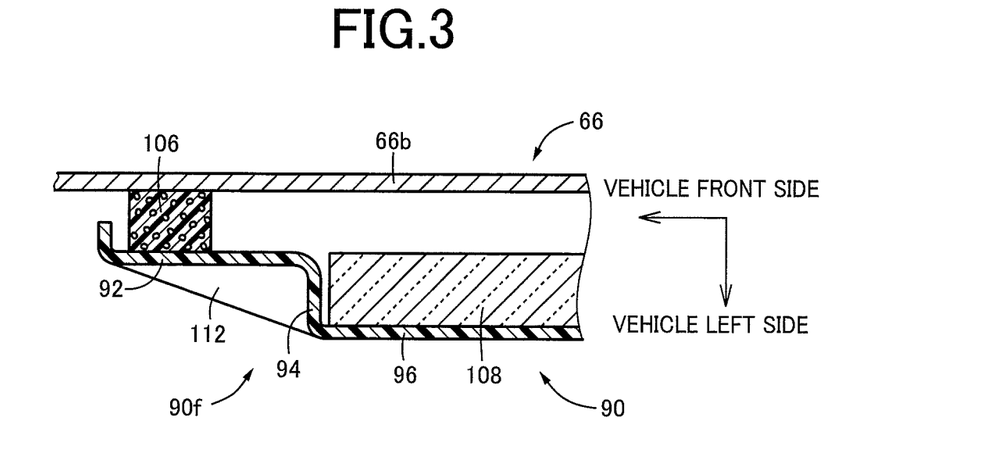
FIG. 3 is a cross-sectional view taken along an arrow portion III-III in FIG. 2.
Figure 4:
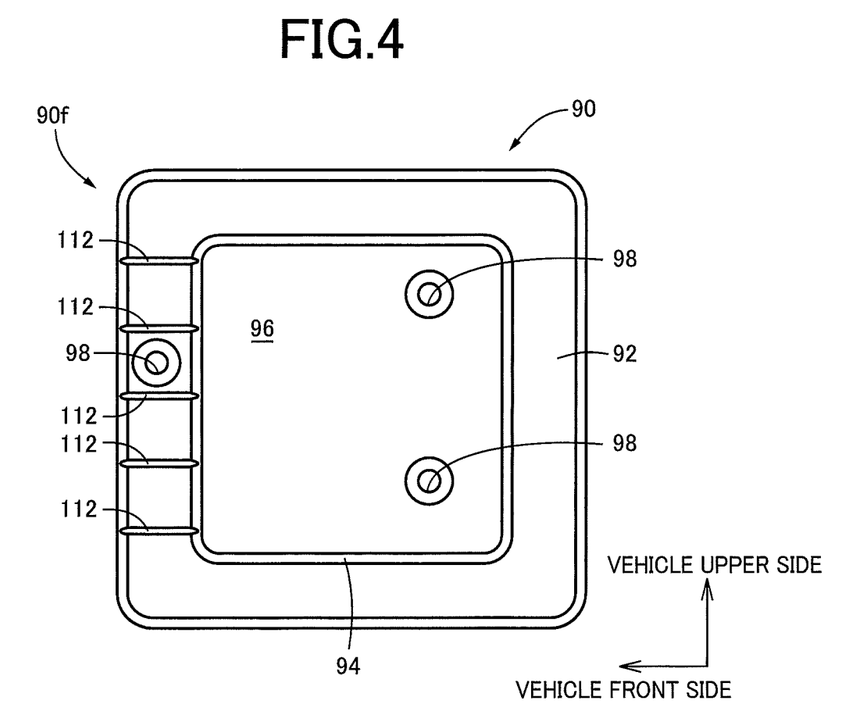
FIG. 4 is a schematic front view showing the cover of FIG. 2 alone.

FIG. 2 is a schematic front view of the cover 90 attached to the rear case portion 66, i.e., a side view thereof from the left side in FIG. 1, and FIG. 3 is a cross-sectional view of the cover 90 taken along an arrow portion III-III in FIG. 2, i.e., a horizontal cross-sectional view thereof that is substantially horizontal. FIG. 4 is a schematic front view showing the cover 90 alone. As is apparent from FIG. 2, the cover 90 covers a large portion of the bottom surface portion 66b of the rear case portion 66, i.e., the side surface of the case 60, and is integrally molded from a 6-nylon-based synthetic resin such as PA66, for example. The cover 90 forms a shallow hat cross-sectional shape and includes a flange portion 92 on the outer circumferential side, a cylindrical side surface portion 94 rising substantially perpendicularly from an inner circumferential edge of the flange portion 92, and a leading-end closing portion 96 closing a leading end of the cylindrical side surface portion 94. The flange portion 92 and the leading-end closing portion 96 are configured to have flat surfaces, for example, or may have a curved surface shape, an uneven shape, etc. changing in accordance with the shape of the rear case portion 66.

The cover 90 as described above is attached to the bottom surface portion 66b in a posture with the leading-end closing portion 96 projecting to the outside (the left side in the example) in the vehicle width direction and the flange portion 92 facing the side surface of the case 60, or specifically, the bottom surface portion 66b of the rear case portion 66. The cover 90 is provided with a plurality of bolt insertion holes 98, and mounting bolts 102 are inserted through the bolt insertion holes 98 and screwed into the bottom surface portion 66b, so that the cover 90 is integrally fixed at a predetermined position on the bottom surface portion 66b. Reference numeral 66c in FIG. 2 denotes insertion holes through which the fastening bolts 70 for fixing the rear case portion 66 to the intermediate case portion 64 are inserted.

Between the flange portion 92 and the bottom surface portion 66b of the cover 90, an annular seal member 106 for soundproofing is disposed over the entire circumference of the flange portion 92. The seal member 106 can be divided into multiple pieces in the circumferential direction or may be disposed only in a portion in the circumferential direction. The seal member 106 is made of EPDM sponge, for example, and is disposed in close contact with an inner surface of the flange portion 92 and an outer surface of the bottom surface portion 66b and integrally fixed with an adhesive etc. A sound absorbing material 108 is also attached to the cover 90 on an inner surface of the leading-end closing portion 96. For the sound absorbing material 108, for example, a nonwoven fabric made of PET (polyethylene terephthalate) is suitably used for the soundproofing against gear noise etc. and the protection of the bottom surface portion 66b. Therefore, the sound absorbing material 108 can function as a cushioning material to prevent damage caused by the contact of the neighboring member 120 with the cover 90 at the time of a vehicle collision. Various sound absorbing materials such as nonwoven fabrics other than PET or felt can be employed for the sound absorbing material 108.

Figure 5:
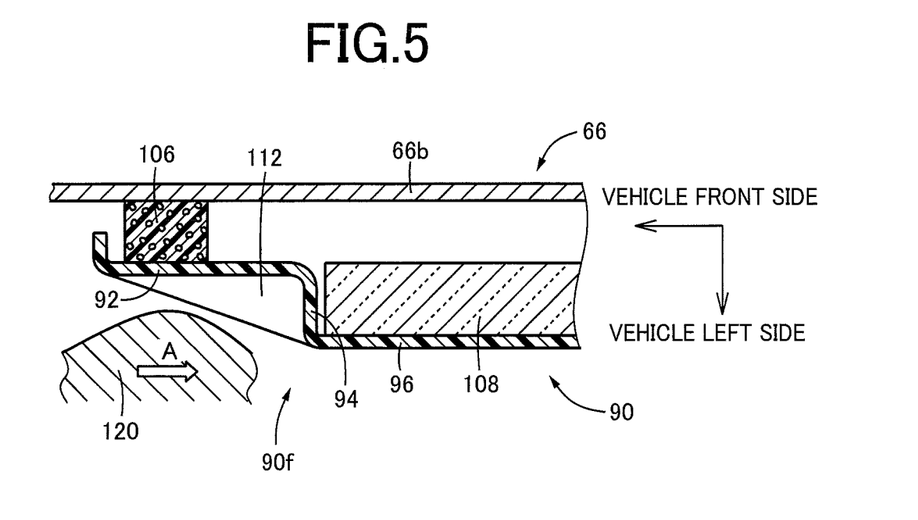
FIG. 5 is a view illustrating a state in which a neighboring member is brought into contact with the cover at the time of a vehicle collision and is a cross-sectional view corresponding to FIG. 3.

A vehicle front-side portion 90f of the cover 90 attached to the bottom surface portion 66b of the rear case portion 66 forms a crank shape having a stepped portion with the vehicle rear side projecting outward in the vehicle width direction in a horizontal cross section shown in FIG. 3. Specifically, the cylindrical side surface portion 94 corresponds to the stepped portion; the flange portion 92 corresponds to a front-side extending portion extending from the stepped portion toward the vehicle front side; the leading-end closing portion 96 corresponds to a rear-side extending portion extending from the leading end of the stepped portion to the vehicle rear side; and the crank shape is formed as a whole. In this case, if the neighboring member 120 coupled to a bumper bends inward as shown in FIG. 5 at the time of a collision of the vehicle and is moved backward relative to the vehicle power transmission device 10 toward the vehicle rear side indicated by an arrow A, a bent corner portion etc. of the neighboring member 120 may be caught on the cylindrical side surface portion 94 that is the stepped portion, possibly breaking the cover 90. A region Ec indicated by a dashed-dotted line in FIG. 2 is a region with which the neighboring member 120 may be brought into contact. If the cover 90 is broken, the neighboring member 120 is more likely to come into direct contact with and damage the bottom surface portion 66b of the rear case portion 66, and a damaged portion (such as a through-hole) of the bottom surface portion 66b is exposed to the outside, possibly exposing the first motor generator MG1 and the second motor generator MG2 of high voltage housed in the case 60 or electric cables thereof etc. The case 60 including the rear case portion 66 is made of a metal such as an aluminum casting having a low toughness and is possibility cracked or pierced due to contact with the neighboring member 120. The first motor generator MG1 and the second motor generator MG2 are high-voltage electric components operated at a high voltage up to about 650 (V), for example.

In this regard, in this example, an inclined rib 112 is disposed at a corner portion between the cylindrical side surface portion 94 serving as the stepped portion and the flange portion 92 serving as the front-side extending portion and is inclined such that the inclined rib 112 approaches to the flange portion 92 from the leading end portion of the cylindrical side surface portion 94 as it extends toward the vehicle front side. The inclined rib 112 has an inclined edge forming a linear shape connecting the leading end of the cylindrical side surface portion 94 and the front end (outer circumferential edge) of the flange portion 92, and the cover 90 is integrally formed with the inclined rib 112, and integrally fixed to the cylindrical side surface portion 94 and the flange portion 92. The inclined rib 112 is one of a plurality of (in the example, five) inclined ribs disposed away from each other in the vehicle vertical direction in a substantially horizontal posture (at ±5° or less) in the vehicle longitudinal direction and the vehicle width direction. The plurality of the inclined ribs 112 is arranged substantially entirely over the contact region Ec of the neighboring member 120, so that the neighboring member 120 is reliably brought into contact with one or more of the inclined ribs 112.

The vehicle power transmission device 10 described above is provided with the inclined ribs 112 in the vehicle front-side portion 90f of the cover 90 at the corner portion between the cylindrical side surface portion 94 serving as the stepped portion and the flange portion 92 serving as the front-side extending portion, and therefore, even the neighboring member 120 relatively moving backward and interfering with the cover 90 at the time of a vehicle collision is moved in a sliding manner on the ends (inclined edges) of the inclined ribs 112 and runs up onto the end (projecting end) of the cylindrical side surface portion 94 while deforming the cover 90 without being caught on the cylindrical side surface portion 94 serving as the stepped portion, so that the damage of the cover 90 is prevented. Particularly, since the plate-shaped inclined ribs 112 provide high rigidity against loads from the front side and the lateral side of the vehicle, the flange portion 92 and the cylindrical side surface portion 94 are pushed inward as a whole so that the contact is suppressed between the cylindrical side surface portion 94 and the neighboring member 120, and the damage of the cover 90 is appropriately prevented as compared to when the flange portion 92 itself is inclined from the outer circumferential edge of the leading-end closing portion 96, for example. Specifically, when the flange portion 92 itself is inclined, the plate-shaped flange portion 92 even having an inclined surface is easily locally dented and deformed and therefore may be broken due to the neighboring member 120 caught on the dented and deformed portion.

When the damage of the cover 90 is prevented in this way, the neighboring member 120 is prevented from coming into direct contact with the bottom surface portion 66b of the case 60, so that the case 60 can properly be protected, and even if the bottom surface portion 66b of the case 60 is damaged, the damaged portion is covered with the cover 90 and therefore prevented from being exposed to the outside. Specifically, since the cover 90 made of synthetic resin is high in toughness and hard to break, only the case 60 having low toughness may be damaged due to the contact with the neighboring member 120, and a hole etc. may be formed.

Since the cover 90 is integrally molded from the synthetic resin with the inclined ribs 112, higher toughness is obtained as compared to a metal plate such as an iron plate, and the damage of the cover 90 is more properly prevented. Since the rigidity is lower as compared to a metal plate, noise (vibration) such as gear noise emitted from the case 60 is absorbed by the cover 90, and the NV (noise and vibration) performance in the vehicle interior is improved. Specifically, a soundproofing measure is taken in addition to a damage prevention measure of the case 60 without increasing the number of vehicle components, so that cost reduction and weight reduction can be achieved as compared to when these measures are separately taken. In this example, the annular seal member 106 is disposed between the flange portion 92 and the bottom surface portion 66b, and the sound absorbing material 108 is attached to the inner surface of the leading-end closing portion 96, so that the soundproofing performance is further improved.

Since the inclined ribs 112 are disposed in a substantially horizontal posture, high rigidity is obtained against loads from the front side and the lateral side of the vehicle, and the effect of preventing the damage of the cover 90 can properly be obtained. Since the inclined ribs 112 are disposed away from each other in the vehicle vertical direction substantially entirely over the contact region Ec, the neighboring member 120 is reliably brought into contact with the inclined ribs 112 regardless of a collision form or is brought into contact with a plurality of the inclined ribs 112, so that the damage of the cover 90 can more properly be prevented.

While the soundproof seal member 106 is disposed between the inner surface of the flange portion 92 and the outer surface of the bottom surface portion 66b, the inclined ribs 112 are disposed such that the inclined ribs 112 include the portion of the flange portion 92 having the seal member 106 disposed on the inner-surface side, and therefore, the rigidity of the flange portion 92 is increased to suppress deformation thereof, so that the sealing performance, i.e., the soundproofing performance, of the seal member 106 can properly be ensured.

The cover 90 forms a hat cross-sectional shape with the flange portion 92, the cylindrical side surface portion 94, and the leading-end closing portion 96 and can cover and properly protect the bottom surface portion 66b that is the side surface of the case 60, and the inclined ribs 112 are disposed at the corner portion between the cylindrical side surface portion 94 and the flange portion 92 in the vehicle front-side portion 90f of the cover 90, so that the damage of the cover 90 is prevented.

Although the first motor generator MG1 and the second motor generator MG2 are housed as electric components using a high voltage, along with the electric cables thereof etc., inside the side surface portion of the case 60 attached to the cover 90, i.e., inside the rear case portion 66, since the damage of the cover 90 is prevented due to the presence of the inclined ribs 112, even if the bottom surface portion 66b of the rear case portion 66 is damaged, the damaged portion is covered by the cover 90 and therefore, the high-voltage motor generators MG1, MG2 and the electric cables etc. are prevented from being exposed to the outside so that safety is secured.

Other examples of the present invention will be described. In the following examples, portions substantially common to the example are denoted by the same reference numerals and will not be described in detail.

Figure 6:
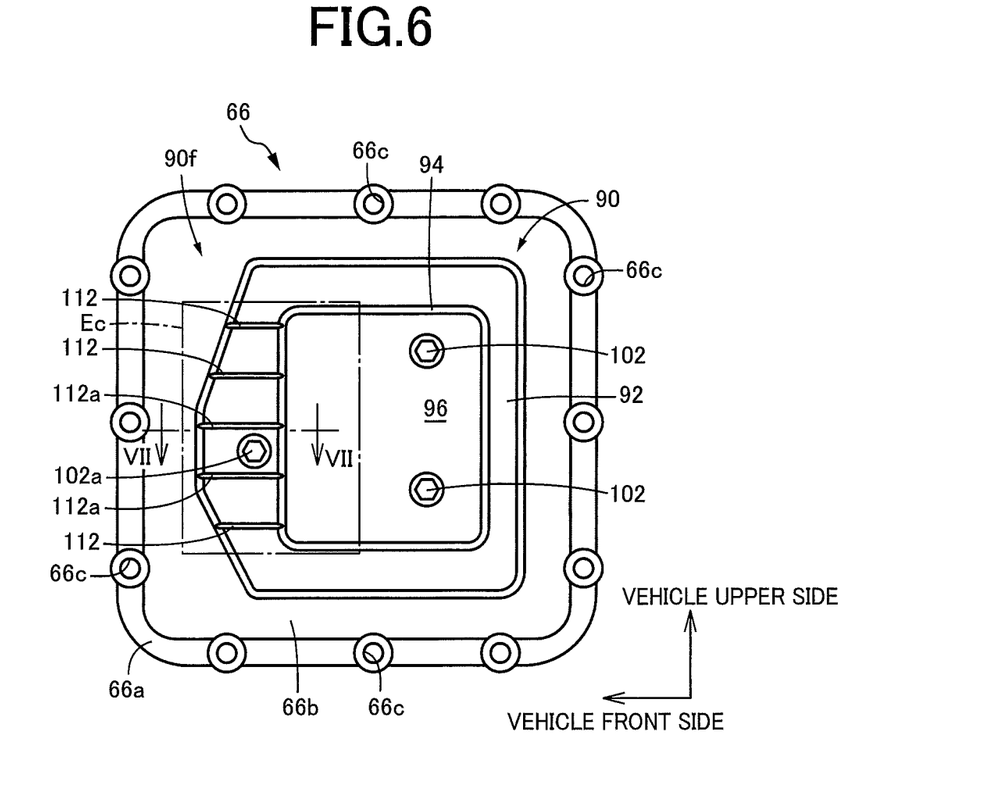
FIG. 6 is a view for explaining another example of the present invention and is a schematic front view corresponding to FIG. 2.
Figure 7:
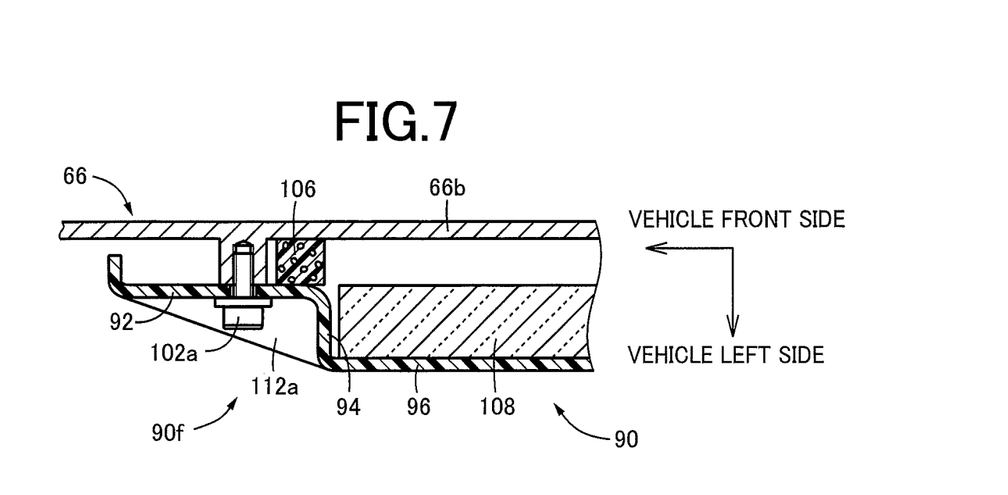
FIG. 7 is a cross-sectional view taken along an arrow portion VII-VII in FIG. 6.

In the above example, the plurality of the mounting bolts 102 fixing the cover 90 to the bottom surface portion 66b includes a mounting bolt 102a (see FIG. 2) in the vehicle front-side portion 90f such that a head portion thereof may project to the lateral side (the vehicle left side) from the vertically adjacent inclined ribs 112. In this case, the neighboring member 120 comes into contact with the head portion of the mounting bolt 102a at the time of a vehicle collision, and the cover 90 may come off from the rear case portion 66 due to shear fracture of the bolt head portion etc. In this regard, in an example shown in FIG. 6 corresponding to FIG. 2 and in FIG. 7 showing a cross section taken along an arrow portion VII-VII in FIG. 6, a pair of inclined ribs 112a at two positions vertically adjacent across the head portion of the mounting bolt 102a is relatively long such that the bolt head portion is hidden when viewed in the vehicle vertical direction. Specifically, the mounting bolt 102a is disposed at a position where the height of the inclined ribs 112a is greater than the projecting dimension of the bolt head portion, i.e., in an inner circumferential side portion of the flange portion 92. As a result, the inclined ribs 112a disposed at the two positions vertically adjacent across the head portion of the mounting bolt 102a reduce or suppress the contact of the neighboring member 120 with the bolt head portion, and the cover 90 is prevented from coming off from the rear case portion 66 due to shear fracture of the bolt head portion etc.

Figure 8:
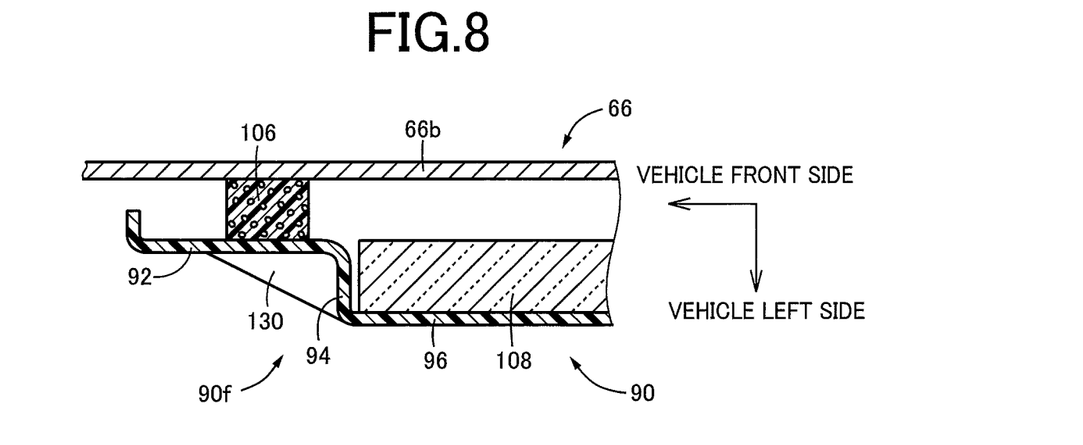
FIG. 8 is a view for explaining still another example of the present invention and is a cross-sectional view corresponding to FIG. 3.

FIG. 8 is a cross-sectional view of the cover 90 corresponding to FIG. 3, and an inclined rib 130 of this example has a shorter dimension in the vehicle longitudinal direction as compared to the inclined ribs 112 and is disposed from the end of the cylindrical side surface portion 94 to an intermediate position of the flange portion 92 serving as the front-side extending portion with regard to the vehicle longitudinal direction. In this case, preferably, the seal member 106 is also disposed on the inner circumferential side portion of the flange portion 92 provided with the inclined rib 130. Even in this example, the neighboring member 120 is restrained from coming into contact with the cylindrical side surface portion 94 serving as the stepped portion, and the damage of the cover 90 is prevented.

Figure 9:
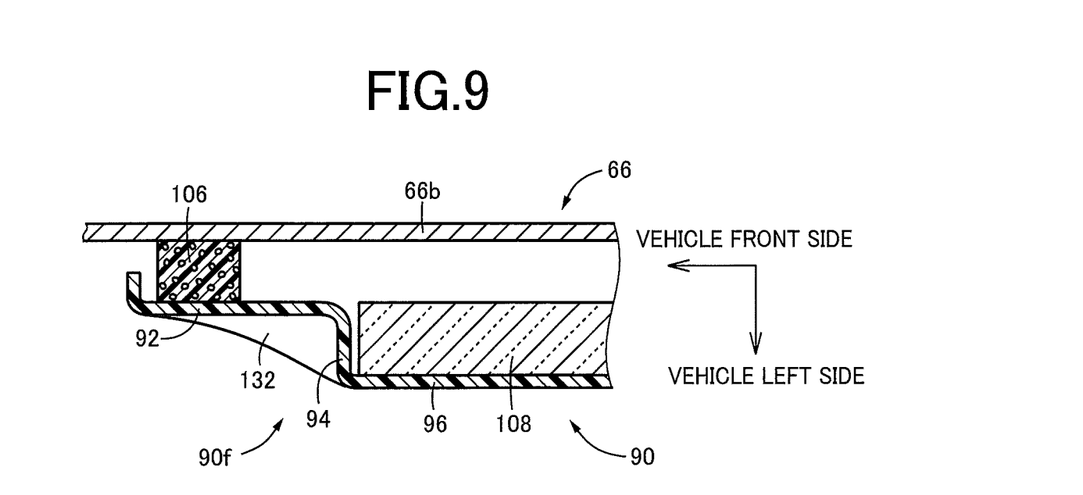
FIG. 9 is a view for explaining still another example of the present invention and is a cross-sectional view corresponding to FIG. 3.

FIG. 9 is a cross-sectional view of the cover 90 corresponding to FIG. 3, and an inclined rib 132 of this example is different from the inclined ribs 112 in that a leading end (inclined edge) in the vehicle width direction forms a smooth concave curve. Even in this case, substantially the same effects can be obtained as in the examples. Instead of the concave curve, a smooth convex curve or an uneven curve may be formed.

Although the examples of the present invention have been described in detail with reference to the drawings, these are merely an embodiment, and the present invention can be implemented in variously modified and improved forms based on the knowledge of those skilled in the art.

What is claimed is:

1. A vehicle power transmission device comprising:
a case housing a power transmission mechanism; and
a cover covering a side surface of the case in a vehicle width direction, wherein the cover includes:
a stepped portion with a vehicle rear-side portion projecting outward in the vehicle width direction in a horizontal cross section,
a front-side extending portion extending from the stepped portion to the vehicle front side, and
a plate-shaped inclined rib disposed at a corner portion between the stepped portion and the front-side extending portion, the inclined rib being located on a first surface of the cover opposite to a second surface of the cover that faces the case, and the inclined rib being inclined toward the front-side extending portion from a leading end portion of the stepped portion to the vehicle front side,
wherein a soundproof seal member is interposed between the front-side extending portion and the side surface of the case, and
wherein the inclined ribs are disposed such that the inclined ribs include a portion of the front-side extending portion in which the seal member is interposed.

2. The vehicle power transmission device according to claim 1, wherein
the cover is made of a synthetic resin integrally with the inclined rib.

3. The vehicle power transmission device according to claim 1, wherein
the cover includes a plurality of the inclined ribs disposed away from each other in a vehicle vertical direction in a substantially horizontal posture.

4. The vehicle power transmission device according to claim 3, wherein
the front-side extending portion is fixed to a side surface of the case by a mounting bolt, and wherein
the inclined ribs are disposed at a plurality of positions including two positions vertically adjacent across a head portion of the mounting bolt.

5. The vehicle power transmission device according to claim 4, wherein
the mounting bolt is disposed at a position where a height of the inclined rib is greater than a projecting dimension of the head portion of the mounting bolt so that the head portion is hidden by the adjacently disposed inclined ribs when viewed in the vehicle vertical direction.

6. A vehicle power transmission device comprising:
a case housing a power transmission mechanism; and
a cover covering a side surface of the case in a vehicle width direction, wherein the cover includes:
a stepped portion with a vehicle rear-side portion projecting outward in the vehicle width direction in a horizontal cross section,
a front-side extending portion extending from the stepped portion to the vehicle front side, and
a plate-shaped inclined rib disposed at a corner portion between the stepped portion and the front-side extending portion, the inclined rib being located on a first surface of the cover opposite to a second surface of the cover that faces the case, and the inclined rib being inclined toward the front-side extending portion from a leading end portion of the stepped portion to the vehicle front side,
wherein the cover forms a hat cross-sectional shape including a flange portion on the outer circumferential side, a cylindrical side surface portion rising from an inner circumferential edge of the flange portion, and a leading-end closing portion closing the leading end of the cylindrical side surface portion,
wherein the cover is attached to the side surface of the case in a posture with the leading-end closing portion projecting to the outside in the vehicle width direction and the flange portion facing the side surface of the case, and
wherein a portion of the cylindrical side surface portion of the cover in the vehicle front side is the stepped portion while a portion of the flange portion of the cover in the vehicle front side is the front-side extending portion.

7. The vehicle power transmission device according to claim 6, wherein
the cover is made of a synthetic resin integrally with the inclined rib.

8. The vehicle power transmission device according to claim 6, wherein
the cover includes a plurality of the inclined ribs disposed away from each other in a vehicle vertical direction in a substantially horizontal posture.

9. The vehicle power transmission device according to claim 8, wherein
the front-side extending portion is fixed to a side surface of the case by a mounting bolt, and wherein
the inclined ribs are disposed at a plurality of positions including two positions vertically adjacent across a head portion of the mounting bolt.

10. The vehicle power transmission device according to claim 1, wherein
the mounting bolt is disposed at a position where a height of the inclined rib is greater than a projecting dimension of the head portion of the mounting bolt so that the head portion is hidden by the adjacently disposed inclined ribs when viewed in the vehicle vertical direction.

11. A vehicle power transmission device comprising:
a case housing a power transmission mechanism; and
a cover covering a side surface of the case in a vehicle width direction, wherein the cover includes:
a stepped portion with a vehicle rear-side portion projecting outward in the vehicle width direction in a horizontal cross section,
a front-side extending portion extending from the stepped portion to the vehicle front side, and
a plate-shaped inclined rib disposed at a corner portion between the stepped portion and the front-side extending portion, the inclined rib being located on a first surface of the cover opposite to a second surface of the cover that faces the case, and the inclined rib being inclined toward the front-side extending portion from a leading end portion of the stepped portion to the vehicle front side, and
wherein an electric component using a high voltage of 400 V or more is housed inside a side surface portion of the case provided with the cover.

12. The vehicle power transmission device according to claim 11, wherein
the cover is made of a synthetic resin integrally with the inclined rib.

13. The vehicle power transmission device according to claim 11, wherein
the cover includes a plurality of the inclined ribs disposed away from each other in a vehicle vertical direction in a substantially horizontal posture.

14. The vehicle power transmission device according to claim 13, wherein
the front-side extending portion is fixed to a side surface of the case by a mounting bolt, and wherein
the inclined ribs are disposed at a plurality of positions including two positions vertically adjacent across a head portion of the mounting bolt.

15. The vehicle power transmission device according to claim 14, wherein
the mounting bolt is disposed at a position where a height of the inclined rib is greater than a projecting dimension of the head portion of the mounting bolt so that the head portion is hidden by the adjacently disposed inclined ribs when viewed in the vehicle vertical direction.

16. A vehicle power transmission device comprising:
a case housing a power transmission mechanism; and
a cover covering a side surface of the case in a vehicle width direction, wherein the cover includes:
  a stepped portion with a vehicle rear-side portion projecting outward in the vehicle width direction in a horizontal cross section,
  a front-side extending portion extending from the stepped portion to the vehicle front side, and
  a plate-shaped inclined rib disposed at a corner portion between the stepped portion and the front-side extending portion, the inclined rib being located on a first surface of the cover opposite to a second surface of the cover that faces the case, and the inclined rib being inclined toward the front-side extending portion from a leading end portion of the stepped portion to the vehicle front side,
wherein the vehicle power transmission device is a transversely-mounted vehicle power transmission device in which the power transmission mechanism is disposed such that rotation axes of the power transmission mechanism are on a plurality of axes substantially parallel to the vehicle width direction,
wherein the vehicle power transmission device includes a rotating machine coupled to the power transmission mechanism in a power transmittable manner at one end portion in the vehicle width direction,
wherein the case includes a rotating-machine-side case portion covering the one end portion, and
wherein the cover is attached to the rotating-machine-side case portion.

17. The vehicle power transmission device according to claim 16, wherein
the cover is made of a synthetic resin integrally with the inclined rib.

18. The vehicle power transmission device according to claim 16, wherein
the cover includes a plurality of the inclined ribs disposed away from each other in a vehicle vertical direction in a substantially horizontal posture.

19. The vehicle power transmission device according to claim 18, wherein
the front-side extending portion is fixed to a side surface of the case by a mounting bolt, and wherein
the inclined ribs are disposed at a plurality of positions including two positions vertically adjacent across a head portion of the mounting bolt.

20. The vehicle power transmission device according to claim 19, wherein
the mounting bolt is disposed at a position where a height of the inclined rib is greater than a projecting dimension of the head portion of the mounting bolt so that the head portion is hidden by the adjacently disposed inclined ribs when viewed in the vehicle vertical direction.

* * * * *